US009829656B2

(12) United States Patent
Saito et al.

(10) Patent No.: US 9,829,656 B2
(45) Date of Patent: Nov. 28, 2017

(54) SPLICE-ON OPTICAL CONNECTOR FOR OUTSIDE PLANT DROP CABLE

(71) Applicant: AFL TELECOMMUNICATIONS LLC, Duncan, SC (US)

(72) Inventors: Daigo Saito, Port Coquitlam (CA); Roger Vaughn, Greer, SC (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 15/106,586

(22) PCT Filed: Dec. 22, 2014

(86) PCT No.: PCT/US2014/071929
§ 371 (c)(1),
(2) Date: Jun. 20, 2016

(87) PCT Pub. No.: WO2015/095872
PCT Pub. Date: Jun. 25, 2015

(65) Prior Publication Data
US 2016/0341912 A1  Nov. 24, 2016

Related U.S. Application Data

(60) Provisional application No. 61/918,814, filed on Dec. 20, 2013.

(51) Int. Cl.
*G02B 6/36* (2006.01)
*G02B 6/38* (2006.01)
(52) U.S. Cl.
CPC ........... *G02B 6/3887* (2013.01); *G02B 6/387* (2013.01); *G02B 6/3846* (2013.01)

(58) Field of Classification Search
CPC .... G02B 6/381; G02B 6/3833; G02B 6/3834; G02B 6/3835; G02B 6/3837; G02B 6/3843; G02B 6/3851; G02B 6/3855; G02B 6/3862; G02B 6/3857
USPC .................. 385/72, 76–87, 134–137, 55, 58
See application file for complete search history.

(56) References Cited

U.S. PATENT DOCUMENTS

| | | |
|---|---|---|
| 4,607,911 A | 8/1986 | Rhodes |
| 7,090,407 B2 | 8/2006 | Melton et al. |
| 7,204,644 B2 * | 4/2007 | Barnes ................. G02B 6/3806 385/139 |
| 7,346,256 B2 * | 3/2008 | Marrs .................. G02B 6/3802 385/134 |
| 7,654,748 B2 * | 2/2010 | Kuffel .................. G02B 6/3806 385/60 |
| 8,388,234 B1 | 3/2013 | Lin et al. |
| 8,408,811 B2 | 4/2013 | de Jong et al. |
| 8,467,653 B2 | 6/2013 | Donaldson et al. |

(Continued)

OTHER PUBLICATIONS

AFL Telecommunications LLC; International Patent Application No. PCT/US2014/071929; International Search Report; dated Mar. 20, 2015 (2 pages).

*Primary Examiner* — Ellen Kim
(74) *Attorney, Agent, or Firm* — Dority & Manning, P.A.

(57) ABSTRACT

A connector assembly for a fiber optic cable comprises a multi-part inner housing adapted to support an optical fiber splice connection structure. A cable clamp is located at a proximal end of the inner housing and is adapted to engage an outer sheath of a fiber optic cable. Preferably, the cable clamp is rotatable with respect to the inner housing.

27 Claims, 6 Drawing Sheets

(56) References Cited

U.S. PATENT DOCUMENTS

| | | | |
|---|---|---|---|
| 8,876,405 B2* | 11/2014 | Larson | G02B 6/3846 385/78 |
| 9,285,543 B2* | 3/2016 | Sun | G02B 6/3846 |
| 2005/0036744 A1 | 2/2005 | Caveney et al. | |
| 2010/0051886 A1 | 3/2010 | Cooke et al. | |
| 2011/0008003 A1 | 1/2011 | Tamekuni et al. | |
| 2012/0121222 A1* | 5/2012 | Castonguay | G02B 6/3887 385/78 |
| 2012/0328248 A1* | 12/2012 | Larson | G02B 6/3887 385/81 |

\* cited by examiner

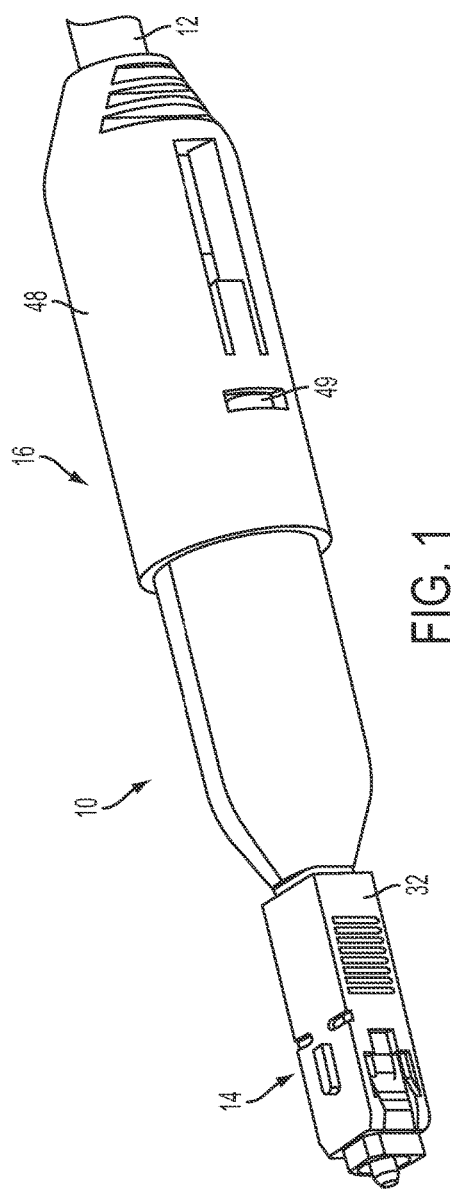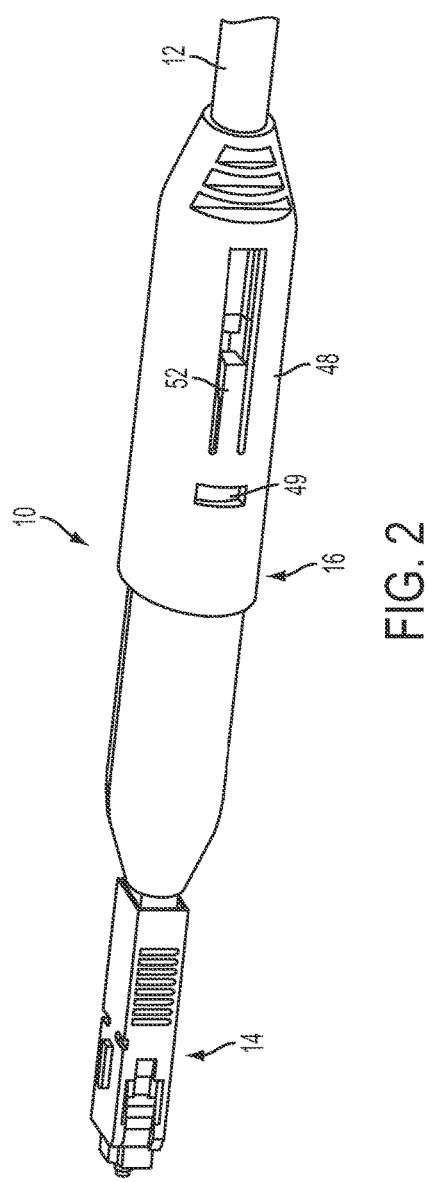

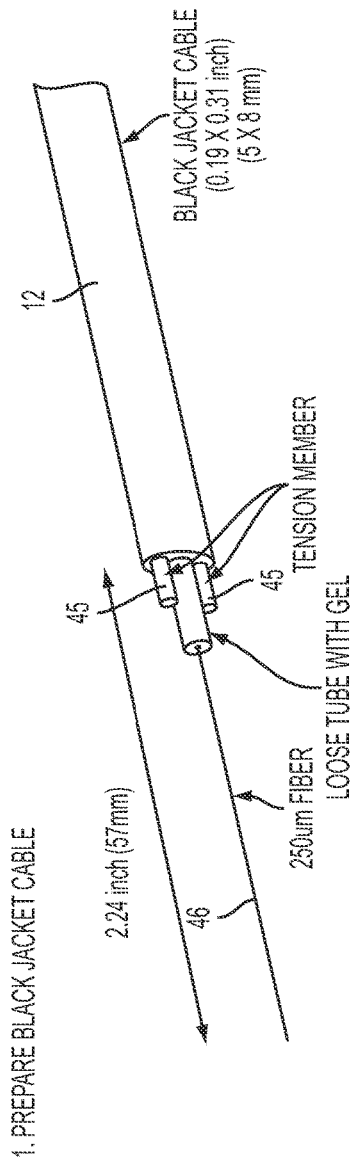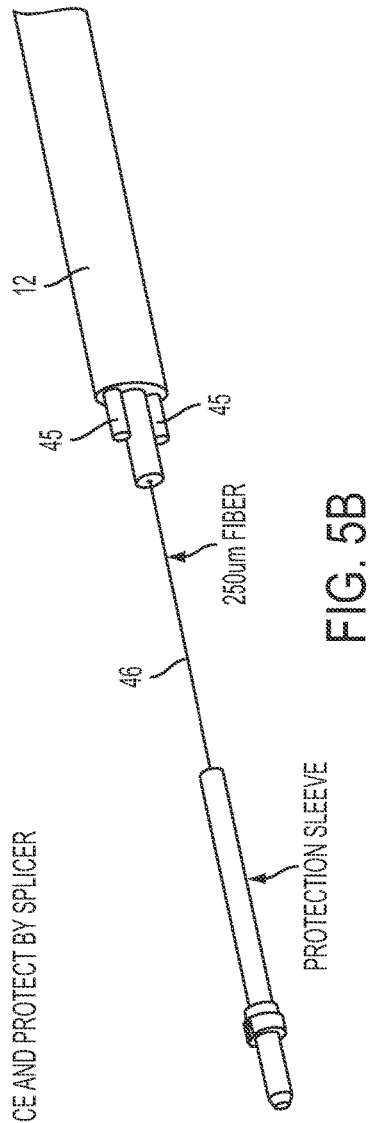
FIG. 5A
FIG. 5B

SPLICE-ON OPTICAL CONNECTOR FOR OUTSIDE PLANT DROP CABLE

This application is based upon and claims priority to U.S. Provisional Patent Application No. 61/918,814, filed Dec. 20, 2013 in the United States Patent and Trademark Office, and is a U.S. national stage filing of International Application No. PCT/US2014/071929 having an international filing date of Dec. 22, 2014, the disclosures of both of which are incorporated by reference herein in their entireties.

BACKGROUND OF THE INVENTION

The present invention relates generally to fiber optic cable. More particularly, the present invention relates to a splice-on optical connector for terminating outside plant drop cable or other optical fiber cable.

The ability of high-quality optical fiber to transmit large amounts of information without appreciable signal degradation is well known. As a result, optical fibers have found widespread use in many applications, such as voice and data transmission. Optical fiber is typically supplied and installed as fiber optic cable. The term "fiber optic cable" refers to the combination of the actual optical fiber plus the structure in which it is carried and protected during and after installation. Generally, a fiber optic cable includes the optical fiber, aramid fibers or other strength members, and an outer sheath. One common type of fiber optic cable used as outside plant drop cable is "flat type cable." Because flat type cable typically has two strength members of aramid fiber reinforced polymer (FRP) located on lateral sides of the optical fiber, it exhibits sufficient stiffness for use as a drop cable.

In this application, current assembly technology uses factory terminated optical connectors. As a result, specific cable lengths are built for various deployments and excess cable is stored on site. While splice on connectors for optical fiber cables exist, they are not available for direct connection to flat drop outside plant cable. A splice-on connector would allow the flat drop outside plant cable to be field installed and the cable cut to the length required.

The present invention recognizes the foregoing considerations, and others, of the prior art.

SUMMARY OF THE INVENTION

According to one aspect, the present invention provides a connector assembly for a fiber optic cable. The connector assembly comprises a multi-part inner housing adapted to support an optical fiber splice connection structure. A cable clamp is located at a proximal end of the inner housing and is adapted to engage an outer sheath of a fiber optic cable. Preferably, the cable clamp is rotatable with respect to the inner housing.

In some exemplary embodiments, the cable clamp has at least one beam which presses against the outer sheath of the fiber optic cable. In this regard, the beam(s) may define a plurality of gripping structures (such as "teeth") on an inside surface thereof. The beam(s) may also define a ramp which is moved into engagement with the fiber optic cable by a complementary ramp on a clamp ring. Preferably, the clamp ring may be configured to be moved axially into interlocking engagement with the cable clamp while urging the at east one beam into engagement with the fiber optic cable.

It will often be desirable for the cable clamp to define an axial slot for receipt of the fiber optic cable. In addition, the cable clamp may be axially movable with respect to the inner housing over a limited axial extent. The cable clamp may include first and second spaced-apart flanges which limit the axial movement of the cable clamp with respect to the inner housing.

The optical splice connection structure may include a splice protection sleeve having an optical connector ferrule located at one end thereof. In this regard, the inner housing may define an elongate stem at a distal end thereof configured to support the protection sleeve. In some exemplary embodiments, the inner housing may comprise two semicircular halves which mate together. Moreover, an outer boot may be received over a portion of the inner housing, the cable clamp being contained in the outer boot. The outer boot in some embodiments may comprise an inwardly-directed projection which limits rotation of the cable clamp with respect to the inner housing to a predetermined angular extent.

Another aspect of the present invention provides a connector assembly for a fiber optic cable. The connector assembly comprises an inner housing having an elongate stem at a distal end thereof, the elongate stem configured to support a protection sleeve of an optical fiber splice connection structure. A cable clamp, located at a proximal end of the inner housing, is rotatable with respect to the inner housing. The connector assembly further includes a clamping element adapted to be moved axially into interlocking engagement with the cable clamp to tighten the cable clamp with respect to the fiber optic cable.

According to a still further aspect, the present invention provides a connector assembly for a fiber optic cable. The connector assembly comprises an inner housing having an elongate stem at a distal end thereof, the elongate stem configured to support a protection sleeve of an optical fiber splice connection structure. A cable clamp, located at a proximal end of the inner housing, is being axially movable with respect to the inner housing over a limited axial extent. The connector assembly further includes a clamping element adapted to be moved axially into interlocking engagement with the cable clamp to tighten the cable clamp with respect to the fiber optic cable.

Another aspect of the present invention involves a method of attaching a fiber optic connector. According to one step of the method, an optical fiber cable is prepared for attachment of the connector including exposing a predetermined length of optical fiber. According to another step, a splice protection sleeve and connector ferrule is attached to a distal end of the optical fiber. A cable clamp is fixed on the fiber optic cable at a location spaced apart from the splice protection sleeve and ferrule. According to another step of the method, a multi-part inner housing is assembled around the optical fiber so as to support the protection sleeve and retain the cable clamp, the cable clamp being rotatable with respect to the inner housing. An outer boot is moved into position such that a portion of the inner housing is received in the outer boot and the cable clamp is fully contained in the outer boot.

Other objects, features and aspects of the present invention are provided by various combinations and subcombinations of the disclosed elements, as well as methods of practicing same, which are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which:

FIG. 1 is a perspective view of a splice-on connector assembly in accordance with an embodiment of the present invention.

FIG. 2 is a perspective view of the splice-on connector assembly of FIG. 1 from a different viewing angle.

FIGS. 5A-5I illustrate various steps in the process of assembling the splice-on connector of FIG. 1 to a flat drop outside plant cable.

Figure 3:
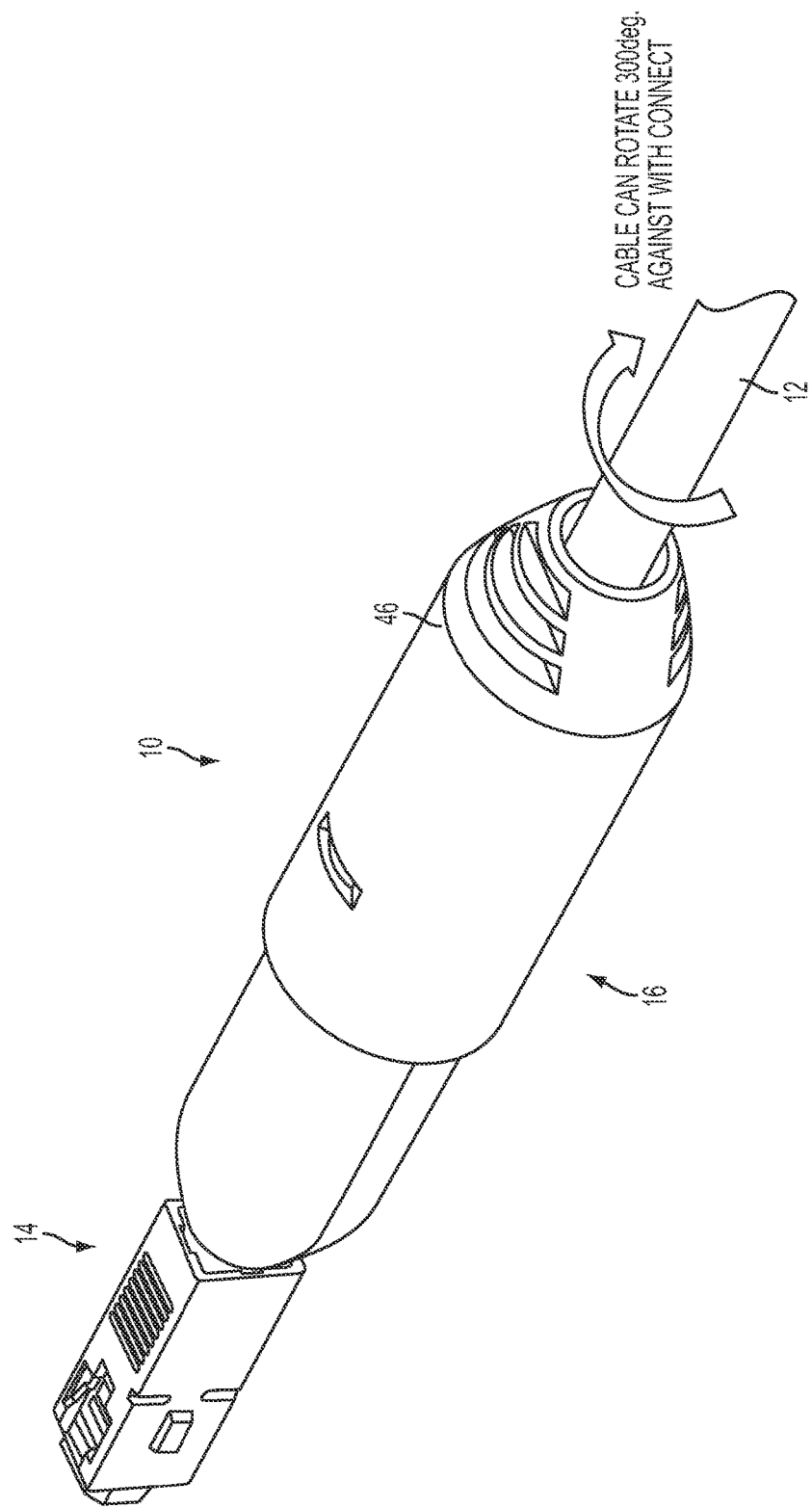
FIG. 3 is a rear perspective view of the splice-on connector assembly of FIG. 1 showing rotation of the cable.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

FIGS. 1 and 2 illustrate an assembled splice-on connector assembly 10 in accordance with an embodiment of the present invention attached to a flat drop cable 12. Generally speaking, connector assembly 10 comprises a plug portion 14 and a support structure 16. As one skilled in the art will appreciate, plug portion 14 is configured to mate with complementary optical sockets. The support structure 16 supports the plug portion and the protection sleeve (where the actual splice is contained), while also being attached to the cable 12. As will be explained, this arrangement provides sufficient retention as to prevent the cable from separating from the connector. As shown in FIG. 3, support structure 16 preferably allows rotation of the cable 12 with respect to plug portion 14 (e.g., up to 300 degrees in this example). In this regard, flat drop cables have preferential bending directions due to the lateral strength (or tension) members. Allowing the connector to swivel in this manner provides an adjustment to align the connector with the socket and prevents imposition of torque at the plug-socket interface due to the cable.

Figure 4A:
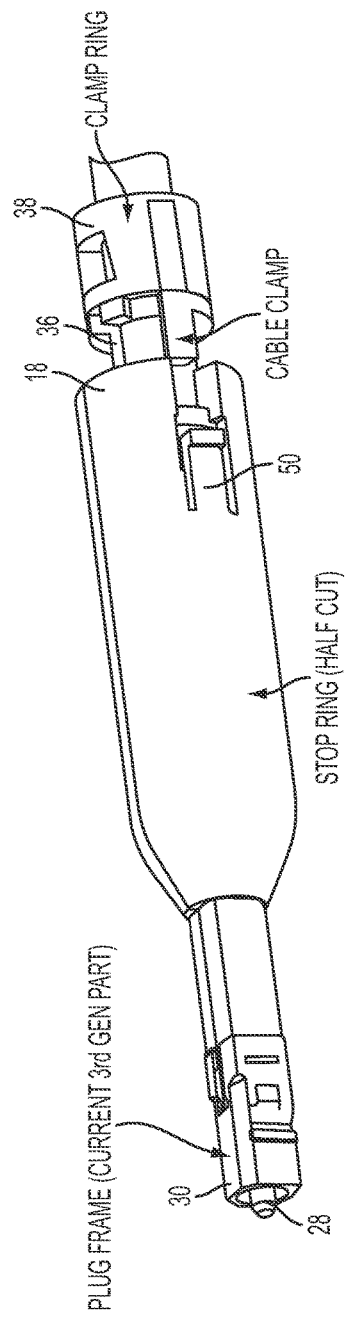
FIG. 4A is a partially assembled view showing components of the splice-on connector assembly of FIG. 1.
Figure 4B:
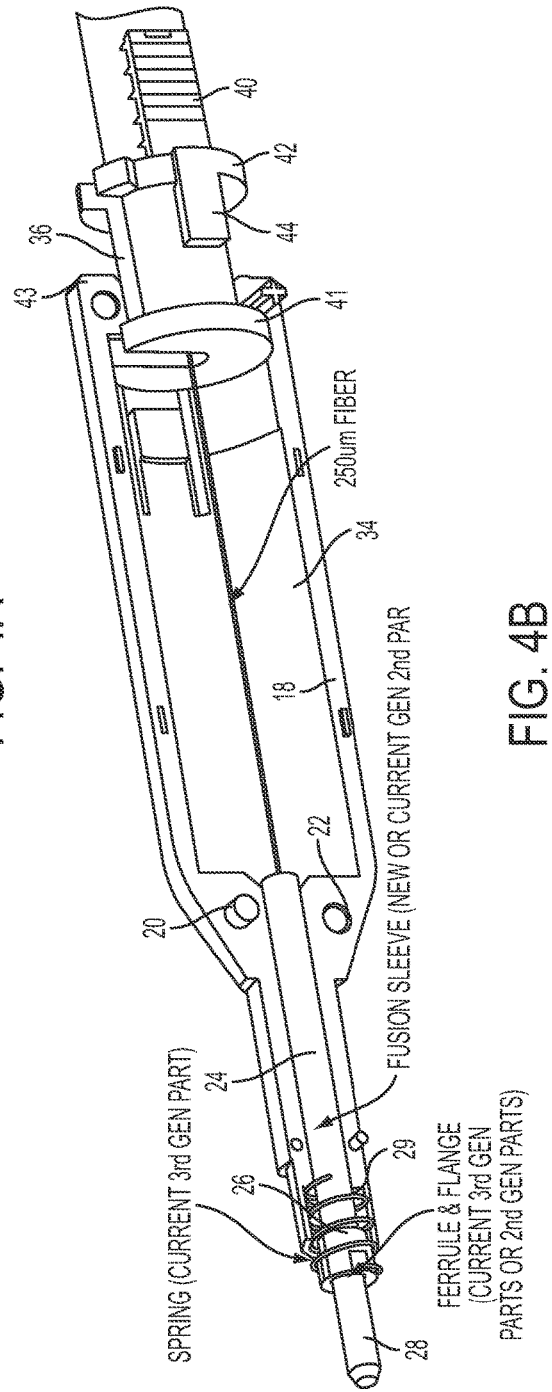
FIG. 4B is a partial cross-sectional view showing components of the splice-on connector assembly of FIG. 1.

Referring now to FIGS. 4A and 4B, certain additional details regarding connector assembly 10 can be explained. As can be seen, connector assembly 10 includes an elongate inner housing 18 formed of two semicircular halves. In the ensuing discussion, this inner housing will be referred to as a "stop ring." The two halves preferably have complementary mating features, such as post 20 and receptacle 22, to facilitate alignment. The distal end portion of stop ring 18 is formed as a rigid stem to support the splice protection sleeve (fusion sleeve) 24, flange 26, and ferrule 28. In this embodiment, ferrule 28 is spring-loaded by a coil spring 29 located between flange 26 and an opposing face of the stop ring stem. When the two halves of stop ring 18 are assembled, a plug frame 30 is received over the end of the rigid stem. In addition, a retainer sleeve 32 (FIG. 1) may be received over the plug frame and rigid stem, as shown.

As can be seen in FIG. 4B, a length of jacketed optical fiber extends between cable 12 and sleeve 24 inside a hollow region 34 of stop ring 18. In this case, for example, the optical fiber is shown as 250 μm optical fiber. As will be apparent from the discussion below, this arrangement provides flexibility which allows the optical fiber to move during attachment of the plug to a socket.

In this embodiment, support structure 16 includes a cable clamp 36 and a clamp ring 38 by which it is attached to cable 12. As shown, cable clamp 36 includes a configured slot in which an end portion of cable 12 is received. Cable clamp 36 further includes a pair of beams (here in the form of ramps 40) which engage the outer sheath of cable 12 when clamp ring 38 is moved into position. The inside faces of ramps 40 preferably define teeth or other suitable structure to firmly grip the sheath of cable 12. It will be appreciated that clamp ring 38 preferably defines complementary ramps that cause the teeth of ramps 40 to squeeze the sheath. To prevent subsequent separation between cable clamp 36 and clamp ring 38, the outer faces of ramps 40 and the inner surfaces of the clamp ring ramps preferably define complementary ratcheting structures to interlock cable clamp 36 and clamp ring 38. Moreover, as greater force is applied to pulling the cable, the tighter the cable clamp becomes.

Cable clamp 36 further includes annular flanges (or stops 41 and 42) which engage an annular lip 43 of stop ring 18. This limits the axial extent that cable 12 can move with respect to the support structure. In addition, cable clamp 12 further includes an axial key 44 which facilitates assembly of the connector assembly (e.g., positioning of the plug frame 30). In addition, key 44 may serve as a rotational stop to limit the angular movement of cable 12 with respect to the connector assembly.

A preferred manner by which connector assembly 10 may be assembled will now be described with reference to the remaining Figures. First, as shown in FIG. 5A, a length of jacketed optical fiber is exposed by removing a portion of the surrounding structure such as the outer sheath (referred to as "black jacket" in the drawing). Note that short lengths of the lateral strengthening members 45 extend beyond the outer sheath in this illustration.

The exposed optical fiber 46 is then stripped, cleaned and cleaved to prepare it for splicing. Next, the prepared optical fiber is spliced to the other side of the ferrule fiber. The resulting splice point is contained and protected within the protection sleeve, as shown in FIG. 5B.

Figure 5D:
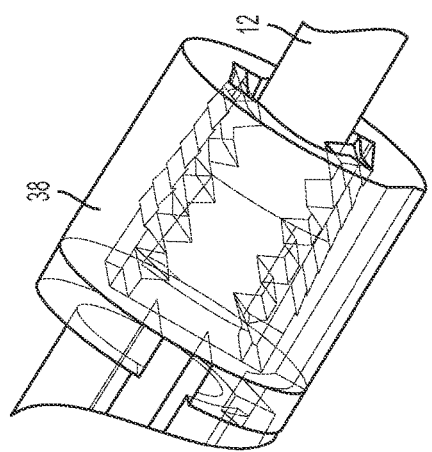
Figure 5E:
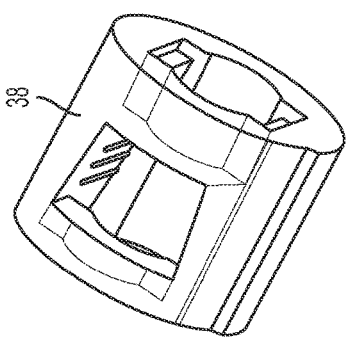
Figure 5C:
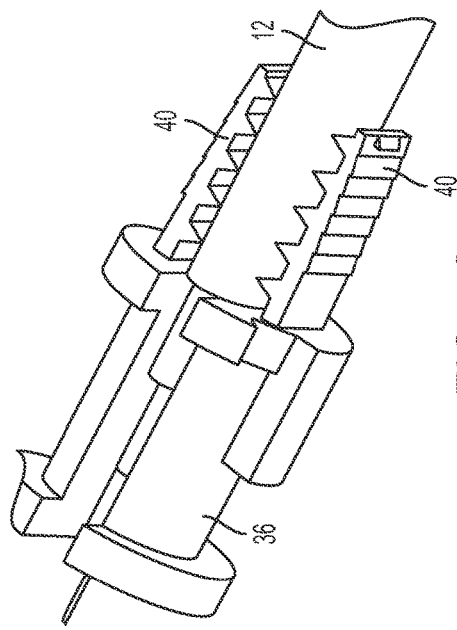
Figure 5F:
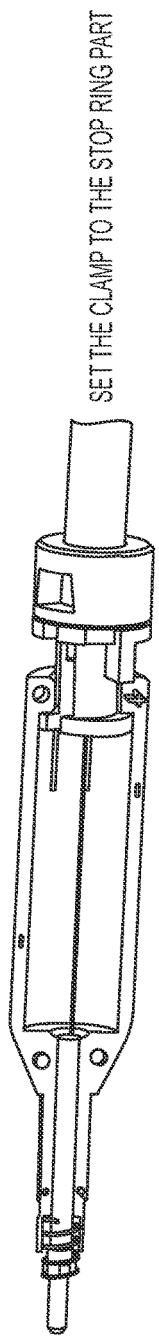
Figure 5G:
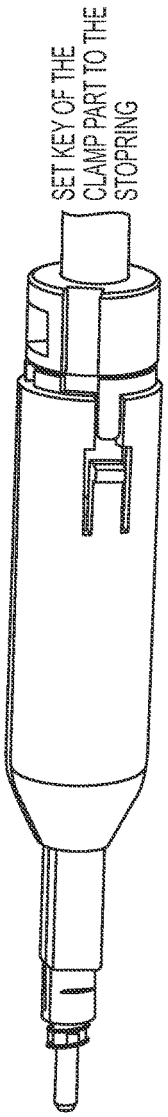
Figure 5H:
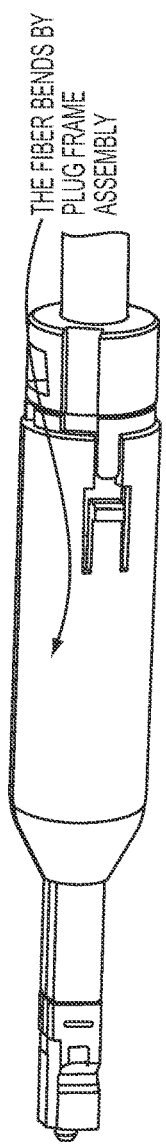
Figure 5I:
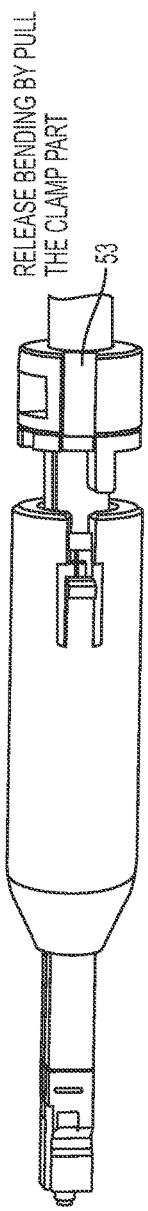

Referring now to FIGS. 5C-5E, the cable is set into the slot of cable clamp 36. In this embodiment, the outer sheath is not received in the slot, but juxtaposes stop 42. The short lengths of exposed strengthening members 45, however, are received in the slot. Next, clamp ring 38, is slid along cable 12 into engagement with cable clamp 36. This causes ramps 40 to firmly engage the sheath such that the connector assembly is attached to cable 12. The optical fiber is not damaged, however, because it is protected from itself being squeezed by the strengthening members 45.

Additional assembly steps are shown in FIGS. 5F-5I. After the protection sleeve, ferrule and spring are set into one part of the stop ring, the other part is positioned to complete the stop ring 18. The key 44 of the cable clamp may then be moved into a corresponding slot on the stop ring to move the plug frame 30 into position. It will be appreciated that this causes the fiber inside the hollow portion of the stop ring 18 to bend. Thus, once the plug frame 30 is in place, the key 44 may be moved out of the slot to release this bending. This also allows the cable to rotate with respect to the support structure over a limited angular range as discussed above. The retainer sleeve 32 may also be positioned over the plug frame and rigid stem of the stop ring.

Finally, outer boot 48 may be snapped into position (see FIGS. 1-3) in order to cover cable clamp 36 and clamp ring 38. In this regard, the stop ring may define flexible arms (such as arm 50 in FIG. 4A) having outwardly directed projections at their distal ends. The arms flex inward to allow boot 48 to be moved into position. But when boot 48 is in position, the projections are received in corresponding apertures 49 in boot 48. Preferably, boot 48 may define an inwardly directed projection 52 which engages key 44 if cable 12 is rotated too much with respect to the connector assembly. It will be appreciated that cable clamp 36 and clamp ring 38 may need to define their own keyways 53 allowing this projection to pass as boot 46 is moved into position.

One skilled in the art will appreciate that embodiments of the present invention offer various advantages in comparison with the prior art. For example, a connector assembly as described above achieve the following advantages:
1. The new design allows for adding connectors in the field. The cable is used most efficiently by cutting to the specific length needed for any given deployment.
2. The new design provides for field termination, thus eliminating the need to store slack cable at the premises. Field termination removes the need to order cables in advance of deployment and reduces the need to inventory various lengths of pre-terminated drop assemblies.
3. Cable clamp method sufficient retention for field deployments and is craft friendly for ease of installation.
4. Split stop ring provides for easy assembly.
5. Adjustment of the connector orientation provides for torque free installation allowing cable to maintain optimum coil configuration.

The following prior art patents are incorporated fully herein by reference in their entireties for all purposes: U.S. Pat. Nos. 8,467,653, 8,408,811, and 7,090,407.

While preferred embodiments of the invention have been shown and described, modifications and variations may be made thereto by those of ordinary skill in the art without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to be limitative of the invention.

What is claimed is:

1. A connector assembly for a fiber optic cable, said connector assembly comprising:
a multi-part inner housing adapted to support an optical fiber splice connection structure;
a cable clamp located at a proximal end of said inner housing and partially disposed within said inner housing, said cable clamp comprising at least one beam, said cable clamp adapted to engage an outer sheath of a fiber optic cable, said cable clamp being rotatable with respect to said inner housing, wherein said cable clamp is axially movable with respect to said inner housing over a limited axial extent, and wherein said cable clamp includes first and second spaced-apart flanges which limit the axial movement of said cable clamp with respect to said inner housing; and
a clamp ring separate from and exterior the inner housing and engageable with the cable clamp.

2. A connector assembly as set forth in claim 1, wherein said at least one beam defines a plurality of gripping structures on an inside surface thereof.

3. A connector assembly as set forth in claim 1, wherein said at least one beam defines a ramp which is urged into engagement with said fiber optic cable by a complementary ramp.

4. A connector assembly as set forth in claim 3, wherein said complementary ramp is defined in said clamp ring.

5. A connector assembly as set forth in claim 4, wherein said clamp ring is configured to be moved axially into interlocking engagement with said cable clamp while urging said at least one beam into engagement with said fiber optic cable.

6. A connector assembly as set forth in claim 1, wherein said cable clamp defines an axial slot for receipt of said fiber optic cable.

7. A connector assembly as set forth in claim 1, wherein said optical splice connection structure includes a splice protection sleeve having an optical connector ferrule located at one end thereof.

8. A connector assembly as set forth in claim 7, wherein said inner housing defines an elongate stem at a distal end thereof configured to support said protection sleeve.

9. A connector assembly as set forth in claim 8, wherein said inner housing comprises two semicircular halves which mate together.

10. A connector assembly as set forth in claim 1, further comprising an outer boot received over a portion of said inner housing, said cable clamp being contained in said outer boot.

11. A connector assembly as set forth in claim 10, wherein said outer boot comprises an inwardly-directed projection which limits rotation of said cable clamp with respect to said inner housing to a predetermined angular extent.

12. A connector assembly for a fiber optic cable, said connector assembly comprising:
an inner housing having an elongate stem at a distal end thereof said elongate stem configured to support a protection sleeve of an optical fiber splice connection structure;
a cable clamp located at a proximal end of said inner housing and partially disposed within said inner housing, said cable clamp comprising at least one beam, said cable clamp being rotatable with respect to said inner housing;
a clamping element separate from and exterior to the inner housing and adapted to be moved axially into interlocking engagement with said cable clamp to tighten said cable clamp with respect to said fiber optic cable; and
an outer boot received over a portion of said inner housing, said cable clamp being contained in said outer boot, wherein said outer boot comprises an inwardly-directed projection which limits rotation of said cable clamp with respect to said inner housing to a predetermined angular extent.

13. A connector assembly as set forth in claim 12, wherein said at least one beam defines a plurality of gripping structures on an inside surface thereof.

14. A connector assembly as set forth in claim 13, wherein said at least one beam defines a ramp which is urged into engagement with said fiber optic cable by a complementary ramp on an inner surface of said clamping element.

15. A connector assembly as set forth in claim 14, wherein said clamping element is configured as a clamp ring.

16. A connector assembly as set forth in claim 12, wherein said cable clamp defines an axial slot for receipt of said fiber optic cable.

17. A connector assembly as set forth in claim 12, wherein said cable clamp is axially movable with respect to said inner housing over a limited axial extent.

18. A connector assembly as set forth in claim 17, wherein said cable clamp includes first and second spaced-apart flanges which limit the axial movement of said cable clamp with respect to said inner housing.

19. A connector assembly as set forth in claim 12, wherein said optical splice connection structure an optical connector ferrule located at one end of said protection sleeve, said ferrule being movable against a spring toward said inner housing.

20. A connector assembly as set forth in claim 12, wherein said inner housing comprises two semicircular halves which mate together.

21. A connector assembly fora fiber optic cable, said connector assembly comprising:
   an inner housing having an elongate stem at a distal end thereof, said elongate stem configured to support a protection sleeve of an optical fiber splice connection structure;
   a cable clamp located at a proximal end of said inner housing and partially disposed within said inner housing, said cable clamp comprising at least one beam, said cable clamp being axially movable with respect to said inner housing over a limited axial extent, wherein said cable clamp includes first and second spaced-apart flanges which limit the axial movement of said cable clamp with respect to said inner housing; and
   a clamping element separate from and exterior to the inner housing and adapted to be moved axially into interlocking engagement with said cable clamp to tighten said cable clamp with respect to said fiber optic cable.

22. A connector assembly as set forth in claim 21, wherein said at least one beam defines a plurality of gripping structures on an inside surface thereof.

23. A connector assembly as set forth in claim 22, wherein said at least one beam defines a ramp which is urged into engagement with said fiber optic cable by a complementary ramp on an inner surface of said clamping element.

24. A connector assembly as set forth in claim 23, wherein said clamping element is configured as a clamp ring.

25. A connector assembly as set forth in claim 21, wherein said inner housing comprises two semicircular halves which mate together.

26. A connector assembly as set forth in claim 21, further comprising an outer boot received over a portion of said inner housing, said cable clamp being contained in said outer boot.

27. A method of attaching a fiber optic connector, said method comprising steps of:
   preparing an optical fiber cable for attachment of said connector including exposing a predetermined length of optical fiber;
   attaching a splice protection sleeve and connector ferrule to a distal end of said optical fiber;
   fixing a cable clamp on said fiber optic cable at a location spaced apart from said splice protection sleeve and ferrule;
   assembling a multi-part inner housing around said optical fiber so as to support said protection sleeve and retain said cable clamp, wherein said cable clamp is partially disposed within said inner housing, said cable clamp comprising at least one beam, said cable clamp being rotatable with respect to said inner housing;
   engaging a clamp ring with the cable clamp, the clamp ring separate from and exterior to the inner housing; and
   moving an outer boot into position such that a portion of said inner housing is received in said outer boot and said cable clamp is fully contained in said outer boot, wherein said outer boot comprises an inwardly-directed projection which limits rotation of said cable clamp with respect to said inner housing to a predetermined angular extent.

* * * * *